United States Patent
Shafik

(10) Patent No.: US 7,921,482 B2
(45) Date of Patent: Apr. 12, 2011

(54) ADJUSTABLE PLUMBING FITTINGS

(76) Inventor: Aasef Shafik, Annandale, VA (US)

( * ) Notice: Subject to any disclaimer, the term of this patent is extended or adjusted under 35 U.S.C. 154(b) by 142 days.

(21) Appl. No.: 12/005,971

(22) Filed: Dec. 28, 2007

(65) Prior Publication Data

US 2008/0148477 A1  Jun. 26, 2008

Related U.S. Application Data

(62) Division of application No. 11/225,979, filed on Sep. 14, 2005, now abandoned.

(51) Int. Cl.
*E03C 1/00* (2006.01)

(52) U.S. Cl. .......................................... 4/681

(58) Field of Classification Search ............... 4/679–681
See application file for complete search history.

(56) References Cited

U.S. PATENT DOCUMENTS

| | | | |
|---|---|---|---|
| 441,691 A * | 12/1890 | McClellan | 4/646 |
| 983,836 A * | 2/1911 | Ley et al. | 261/52 |
| 1,204,728 A | 11/1916 | Arena | |
| 3,136,570 A | 6/1964 | Lee | |
| 3,583,003 A * | 6/1971 | Thompson | 4/679 |
| 3,695,634 A | 10/1972 | White, Jr. | |
| 3,847,392 A | 11/1974 | Horwinski | |
| 3,853,339 A * | 12/1974 | Wilson | 285/135.4 |
| 4,386,796 A | 6/1983 | Lyall | |
| 4,687,232 A | 8/1987 | Zimmerman | |
| 4,932,686 A | 6/1990 | Anderson, Jr. | |
| 5,024,469 A | 6/1991 | Aitken et al. | |
| 5,052,721 A | 10/1991 | Gorman, Jr. | |
| 5,160,174 A | 11/1992 | Thompson | |
| 5,190,320 A | 3/1993 | Hodges | |
| 5,297,817 A | 3/1994 | Hodges | |
| 5,524,935 A | 6/1996 | Everts | |
| 5,697,393 A | 12/1997 | Mirlisena | |
| 6,070,910 A | 6/2000 | Hodges | |
| 6,681,420 B1 | 1/2004 | Ball | |

* cited by examiner

*Primary Examiner* — Huyen Le
(74) *Attorney, Agent, or Firm* — Dennis H. Lambert, Esq.

(57) ABSTRACT

An adjustable plumbing fitting has a piston rotatably and telescopically engaged in a housing, with one end of the housing adapted to be connected to a first plumbing part, and a cylindrical extension on the piston projecting from an opposite end of the housing and adapted to be connected to a second plumbing part. In one embodiment, two housings and associated pistons are integrally joined together to form a T-fitting for connecting the overflow and drain of a bathtub. In another embodiment, the housing is integrally formed with a J-shaped drain trap, and in another embodiment the housing and/or piston is integrally formed with a water closet flange.

1 Claim, 5 Drawing Sheets

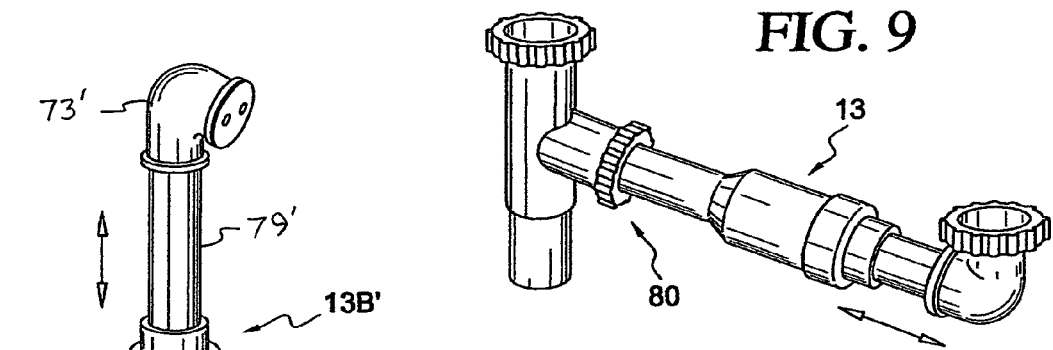
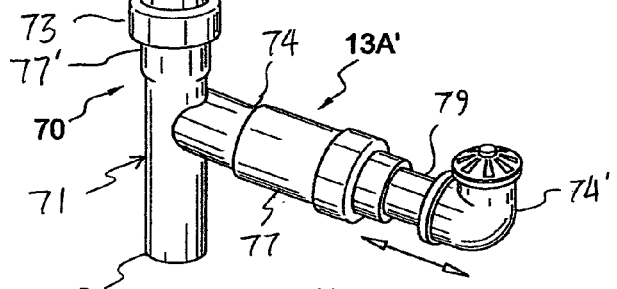
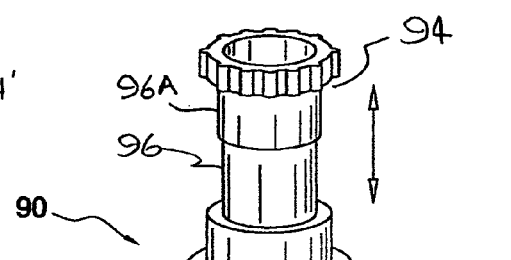
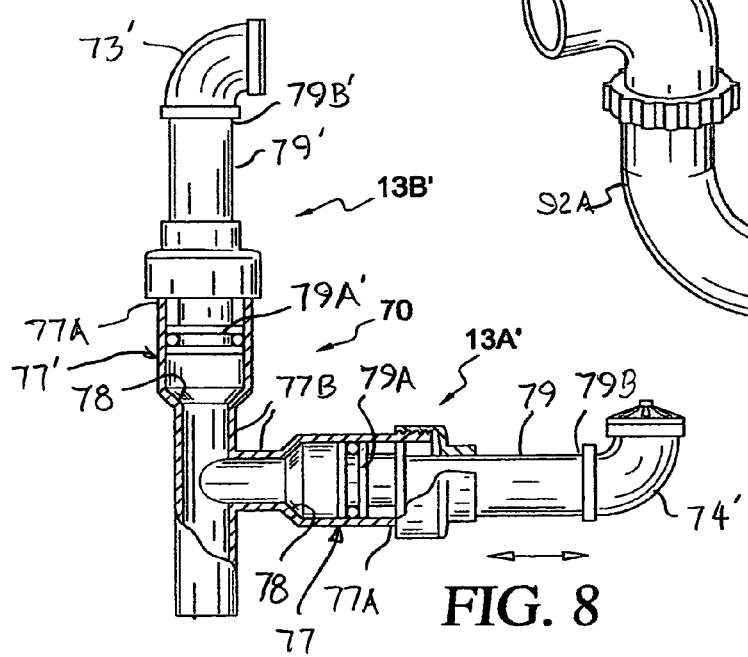
FIG. 7
FIG. 9
FIG. 8
FIG. 10

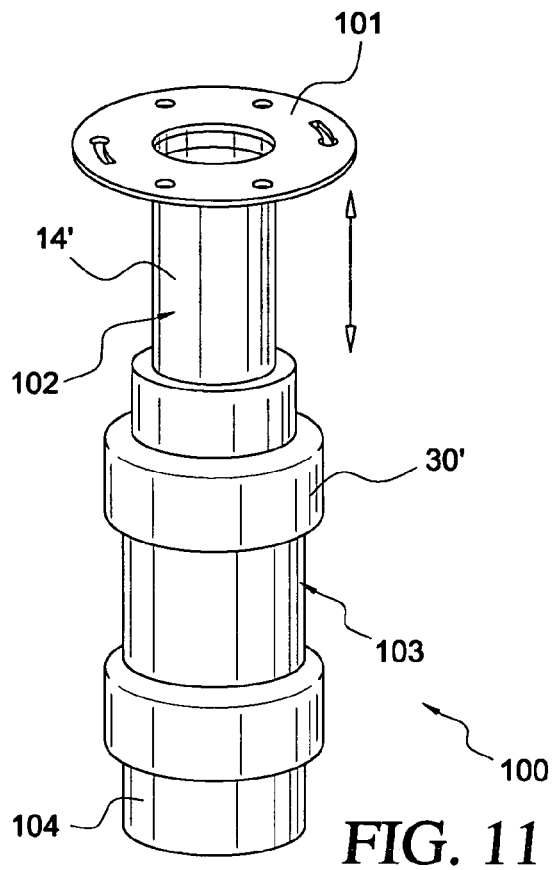
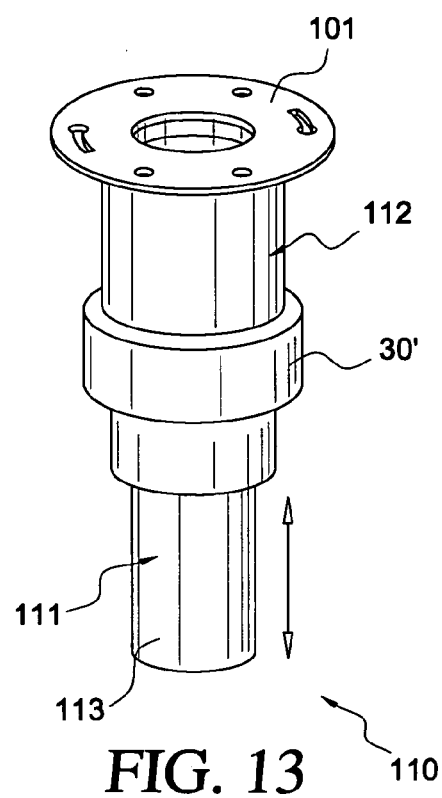
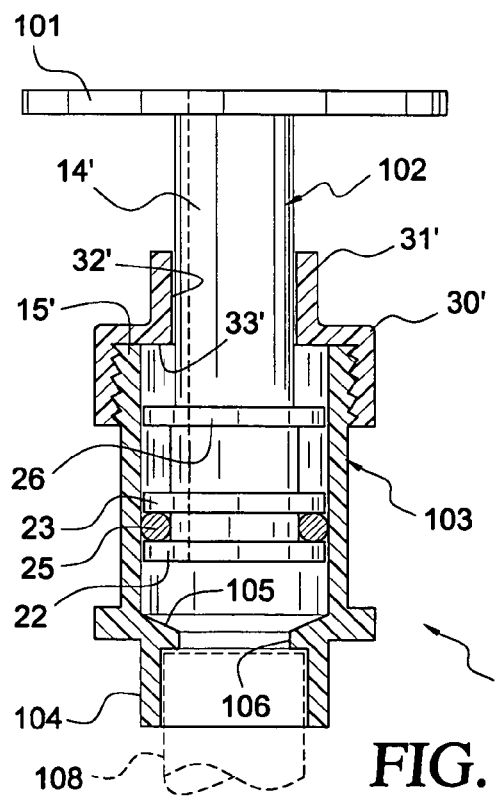
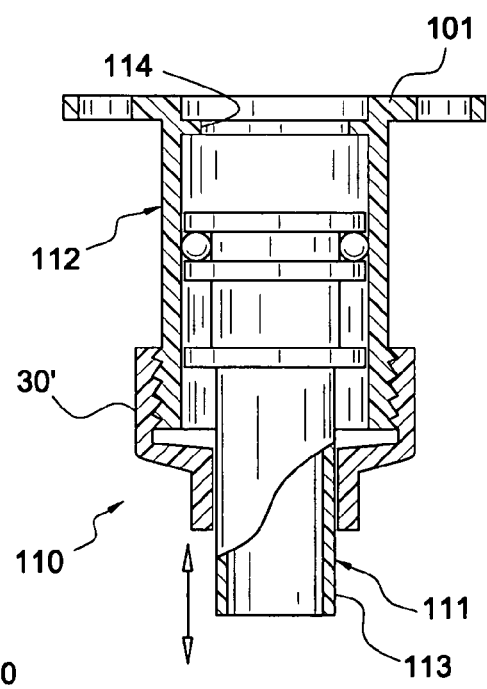
FIG. 11
FIG. 13
FIG. 12
FIG. 14

ADJUSTABLE PLUMBING FITTINGS

This application is a divisional of application Ser. No. 11/225,979, filed Sep. 14, 2005 now abandoned.

BACKGROUND OF THE INVENTION

1. Field of the Invention

This invention relates to plumbing fittings, particularly to adjustable fittings that are easy to use and install. More specifically, the invention relates to adjustable closet flanges and repair couplings or tail pieces.

2. Prior Art

Plumbing fittings are provided in a variety of shapes, sizes and designs to facilitate connection of pipes to each other and to appliances and fixtures such as lavatories, sinks, bathtubs, showers, water closets, and the like, and for other purposes known to those skilled in the art. For example, these fittings may be designed to couple or adapt a pipe of a first diameter to a pipe of a different diameter, or to connect the overflow and/or drain from a bathtub or sink to a drain pipe, or to connect a water closet to a sewage drain pipe, or to repair previously installed pipes or fittings, and the like.

The fittings generally are provided with either a threaded connection, a compression coupling, or parts that are adapted to be glued together to enable the fitting to be coupled with other plumbing parts and components. Some fittings are provided with telescopic connections to enable the length of the fitting to be adapted to the spacing between parts being connected.

Examples of prior art fittings are disclosed in U.S. Pat. Nos. 4,386,796, 4,687,232, 5,190,320, 5,297,817, 6,070,910 and 6,681,420.

The telescopic pipe repair coupling described in U.S. Pat. No. 4,386,796 is designed for repairing a break in a length of pipe, and comprises an internally reinforced hollow piston 17 reciprocable within an externally reinforced cylinder 11 having inturned ends forming shoulders 33 and 35 at its opposite ends for limiting travel of the piston in the cylinder. The piston protrudes from one end of the cylinder to form a connector tube 53 for attachment to one end of the length of broken pipe, and the opposite end of the cylinder has a hollow bore for receiving an adjacent end of the length of broken pipe, whereby the broken ends are spliced or coupled together. An internal annular ring in the bore forms a butt shoulder 41 for limiting the extent of insertion of said adjacent end of the pipe into the cylinder.

A similar telescopic pipe repair coupling is described in U.S. Pat. No. 4,687,232, wherein a piston cylinder 20 having a piston section 26 and a pipe section 24 is reciprocable within a cylindrical housing 12. A bushing 38 is adhesively secured within one end of the housing 12, and a stop shoulder 23 is formed in the other end to retain the piston within the housing. The bushing is used to secure one end of the repair coupling to an end of the broken length of pipe, and a coupling member 50 is used to secure the pipe section 24 to an adjacent end of the broken length of pipe, thereby splicing or coupling the broken ends together.

The '796 and '232 patents are both designed and intended for repairing a break in a pipe, and thus are constructed to couple together two lengths of pipe of the same diameter. Moreover, each of them has interior surfaces at right angles to the direction of flow, forming obstructions that can eventually trap sediment or other debris and lead to clogging of the pipe.

U.S. Pat. No. 5,190,320 discloses a telescoping closet flange for bringing a vertical sewage drain pipe even with the level of a floor. The flange includes a cylindrical body 26 that is slid over the end of the drain pipe, and a cylindrical seal 28, slide 30 and seal cap 32 held together by shoulder bolts 56. The seal 28 and associated components 30 and 32 have tapered surfaces that coact to tighten the seal about the body 26 when the shoulder bolts are tightened.

A somewhat similar arrangement is shown in U.S. Pat. No. 5,297,817, except that the flange has an upper section 12, separate lower section 14, and a surrounding seal 16, all adapted to be inserted into the end of the sewage drain pipe 36. Bolts 18a, 18b and 18c are extended between the upper and lower sections to draw them toward one another to compress the seal against the inner surface of the drain pipe.

U.S. Pat. No. 6,070,910 discloses a push-in closet flange, wherein an o-ring seal 16 is positioned around the cylindrical end 14 of the flange, and the end 14 is then pushed into the end of the sewage drain pipe until the proper height of the flange is achieved.

The devices disclosed in the '320, '817 and '910 patents all have limited adjustment and require fairly close measurement and cutting of the drain pipe in order to achieve proper positioning of the flange. Moreover, the '320 and '817 devices require the use of separate fasteners and assembly of multiple parts, increasing the difficulty and time required to complete an installation.

U.S. Pat. No. 6,681,420 discloses a T-fitting for connecting the drain and overflow of a bathtub to a drain pipe. The one-piece T-fitting eliminates the several parts previously required to connect the overflow and drain of a bathtub to the drain pipe, but there are no telescopic parts and the components are rigidly connected after the pipe ends are inserted and glued in place in the T-fitting.

It would be desirable to have a fitting that was simple in construction, involved a minimum number of parts, was easy to use, and that provided ample adjustment to accommodate the situations likely to be encountered in a typical installation.

SUMMARY OF THE INVENTION

The present invention is a telescopic plumbing fitting that is substantially devoid of sharp internal shoulders, is simple in construction, involves a minimum number of parts, is easy to use, and provides ample adjustment to reduce the need to make accurate measurements and cuts during a typical installation.

In accordance with its simplest aspect, the fitting of the invention comprises an in-line telescopic coupler or tailpiece for joining together two lengths of pipe of the same or different diameters, or for connecting a drain, overflow, dishwasher, garbage disposal, or other device or appliance to a drain pipe or water supply pipe, or other device as appropriate.

According to a second aspect, the telescopic fitting is integrally incorporated in a drain trap.

According to a third aspect, orthogonally disposed telescopic fittings are integrally incorporated in a T, especially adapted to connect the drain and overflow from a bathtub, for example.

According to a fourth aspect, the telescopic fitting is integrally incorporated in a water closet flange.

In all aspects of the invention, the telescopic fitting comprises a piston that is both reciprocable and rotatable within a cylindrical housing, forming a slip joint. A cylindrical extension of the piston projects from one end of the housing for attachment to a length of pipe, or to a drain fitting, or to another device or appliance. In some embodiments the other end of the housing is a cylindrical part adapted to be connected to a pipe or other device, and in other embodiments the other end of the housing is integrally formed with another plumbing part, such as a drain trap, or a T, for example. In still other embodiments, either the housing part or the piston part is integrally formed with a water closet flange, and the other part is adapted to be connected with a sewage drain pipe.

The cylindrical housing is open at both ends, and in one embodiment one end has a larger diameter than the other end, defining an interior annular tapered shoulder between the ends. In the preferred embodiment, the smaller end has smooth interior and exterior surfaces and may be secured to another plumbing part by use of adhesive. The opposite end of the housing may be smooth for a glued connection, or may be threaded or flanged for other types of common and well known connections.

The piston comprises an elongate cylindrical body with first and second closely spaced annular rings on one end thereof, and a cylindrical extension at the other end. An o-ring seal is retained between the first and second rings for affecting a sliding seal with the interior surface of the housing. A third annular ring is on the body, spaced from the pair of rings toward the cylindrical extension.

A collar or cap is secured on said one end of the housing, with a reduced diameter portion having a central bore therethrough and defining an annular shoulder facing axially inwardly of the housing. The cylindrical extension on the piston extends slidably through the central bore in the cap, and the third annular ring on the piston cooperates with the annular shoulder in the cap to retain the piston in the housing. The end of the piston carrying the o-ring cooperates with the tapered annular shoulder in the housing to limit the extent of telescoping of the piston into the housing. In a preferred embodiment, the cap is threaded onto the housing.

The fitting thus described can be used to connect two pipes together in coaxial relationship, or to connect other plumbing parts together when adjustment of the length of the fitting is helpful or necessary. For instance, the fitting can be adapted as a tailpiece to connect with a sink drain or flush valve or the like, or it can be combined with other parts to facilitate the connection of the overflow and drain of a bathtub to a drain pipe or T, or similar connections where length adjustment of the fitting is desired or necessary.

The piston and housing can be integrally incorporated in a drain trap, or in a T-fitting to facilitate connection of plumbing parts, or they can be integrally incorporated in a water closet flange to facilitate the connection of a water closet with a sewage drain pipe.

Use of the fitting of the invention makes it unnecessary to accurately measure and cut pipes to splice them together and/or connect them with other plumbing components, and enables a standard size fitting to be used to connect components having different spacing between the parts to be connected. For example, the T-fitting of the invention, incorporating two orthogonally disposed slip joints, greatly facilitates connection of the drain and overflow of a bathtub, and permits a single fitting to be used with tubs having different spacing between the overflow and drain.

The water closet flange of the invention, incorporating a slip joint, makes it easy to adjust the height of the flange as necessary to accommodate the level of a floor in which the flange is being installed, and also permits the flange to be rotated to different angular positions to facilitate receipt of fasteners in securing a water closet to the flange.

BRIEF DESCRIPTION OF THE DRAWINGS

The foregoing, as well as other objects and advantages of the invention, will become apparent from the following detailed description when taken in conjunction with the accompanying drawings, wherein like reference characters designate like parts throughout the several views, and wherein:

FIG. 7 is a perspective view of a T-fitting incorporating two orthogonally disposed slip joints according to the invention, adapted for connecting the drain and overflow of a bathtub with a drain pipe.

FIG. 8 is a side view in elevation of the fitting of FIG. 7, with portions shown in section.

FIG. 9 is a perspective view of the inline fitting assembled with other plumbing parts to form a continuous waste fitting adapted to connect the drains of a double sink, for example, with a drain pipe.

FIG. 10 is a perspective view of the slip joint of the invention integrally incorporated in a drain trap.

FIG. 11 is a perspective view of a first embodiment of a water closet flange integrally incorporating the slip joint of the invention.

FIG. 12 is a longitudinal sectional view of the water closet flange of FIG. 11.

FIG. 13 is a perspective view of a second embodiment of a water closet flange integrally incorporating the slip joint of the invention.

FIG. 14 is a longitudinal sectional view of the water closet flange of FIG. 13.

DETAILED DESCRIPTION OF PREFERRED EMBODIMENTS

Figure 1:
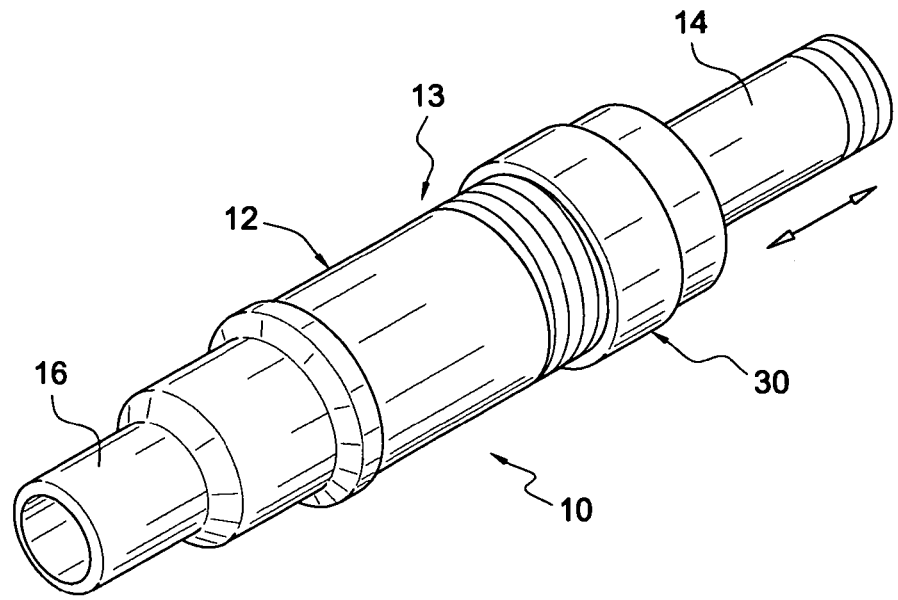
FIG. 1 is a perspective view of an inline telescopic fitting incorporating features according to a first aspect of the invention.
Figure 2:
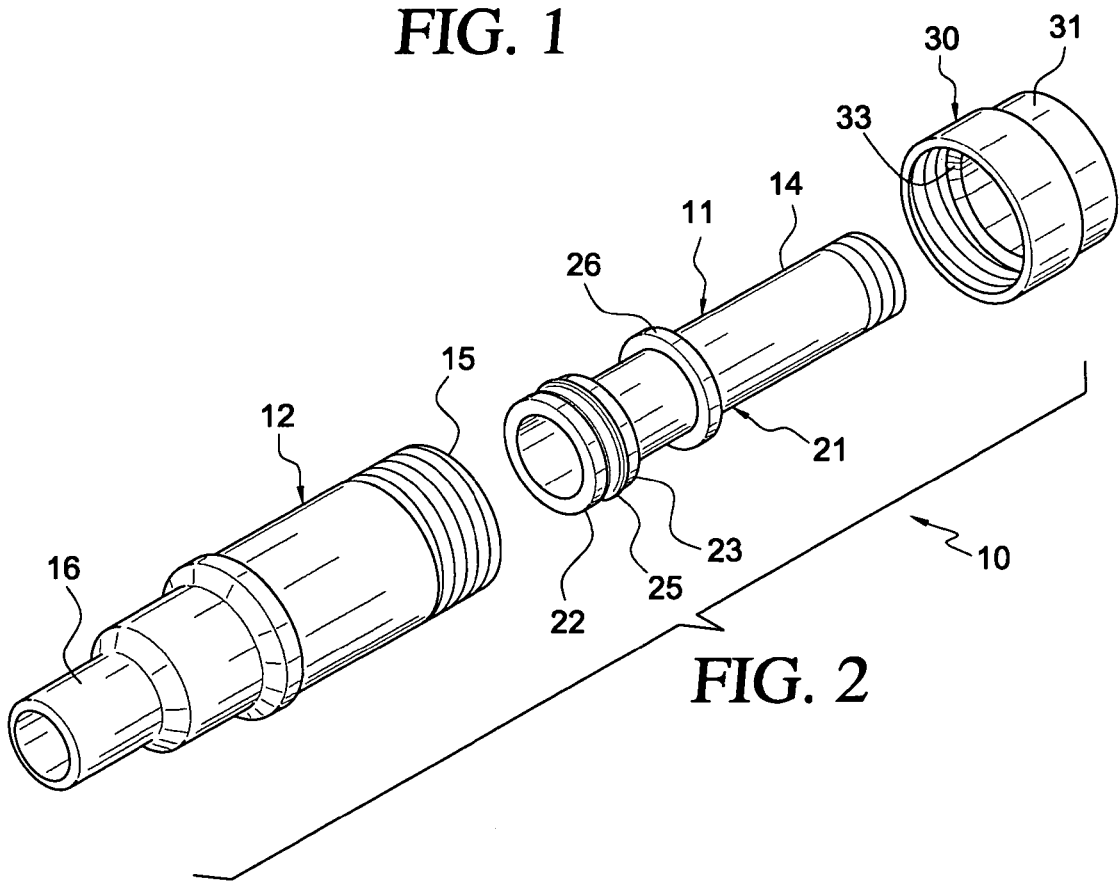
FIG. 2 is an exploded perspective view of the fitting of FIG. 1, showing the parts in exploded relationship.
Figure 3:
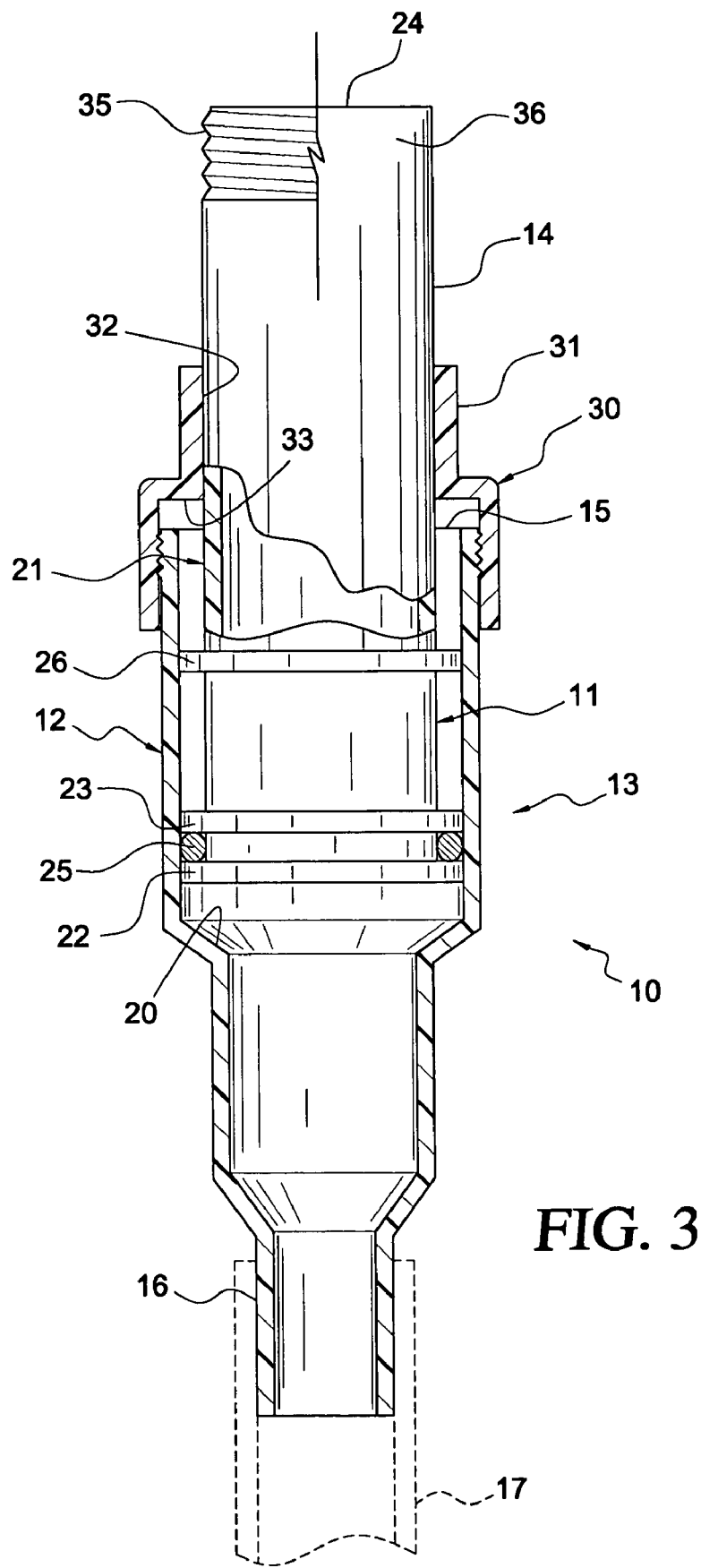
FIG. 3 is a longitudinal sectional view of the fitting of FIGS. 1 and 2.

An inline fitting incorporating the slip joint of the invention is indicated generally at 10 in FIGS. 1-3. The fitting comprises a piston 11 that is both reciprocable and rotatable within a cylindrical housing 12, forming a slip joint 13. A cylindrical extension 14 of the piston projects from one end 15 of the housing for attachment to a length of pipe (not shown), or to a drain fitting (not shown), or to another device or appliance (not shown). In the embodiment shown in FIGS. 1-3, the other end 16 of the housing is a smooth-surfaced cylindrical part adapted to be connected to a pipe or other device (indicated by broken lines at 17), typically by use of an adhesive. It should be understood, however, that this could be a threaded or other connection, as desired.

The cylindrical housing 12 is open at both ends, and in the embodiment shown in FIGS. 1-3, the end 15 has a larger diameter than the end 16, defining an interior annular tapered shoulder 20 between the ends.

The piston 11 comprises an elongate cylindrical body 21 with first and second closely spaced annular rings 22 and 23 on one end thereof, and the cylindrical extension 14 at the other end. An o-ring seal 25 is retained between the first and second rings for affecting a sliding seal with the interior surface of the housing. A third annular ring 26 is on the body, spaced from the pair of rings toward the cylindrical extension, and functions to help align the piston coaxially with the housing, and to retain the piston in the housing as explained hereinafter.

A collar or cap 30 is secured on the end 15 of the housing, with a reduced diameter portion 31 having a central bore 32 therethrough and defining an annular shoulder 33 facing axially inwardly of the housing. The cylindrical extension 14 on the piston extends slidably through the central bore 32 in the cap, and the third annular ring 26 on the piston cooperates with the annular shoulder in the cap to retain the piston in the housing. In a preferred embodiment, the cap is threaded onto the housing. The end of the piston carrying the o-ring cooperates with the tapered annular shoulder 20 in the housing to limit the extent of telescoping of the piston into the housing.

The outer end 24 of the cylindrical extension 14 may be externally threaded, as indicated at 35 in the split view of FIG. 3, or it may be smooth as indicated at 36 in the split view, or it may be flanged (not shown), or have other coupling means common in the art.

Figure 4:
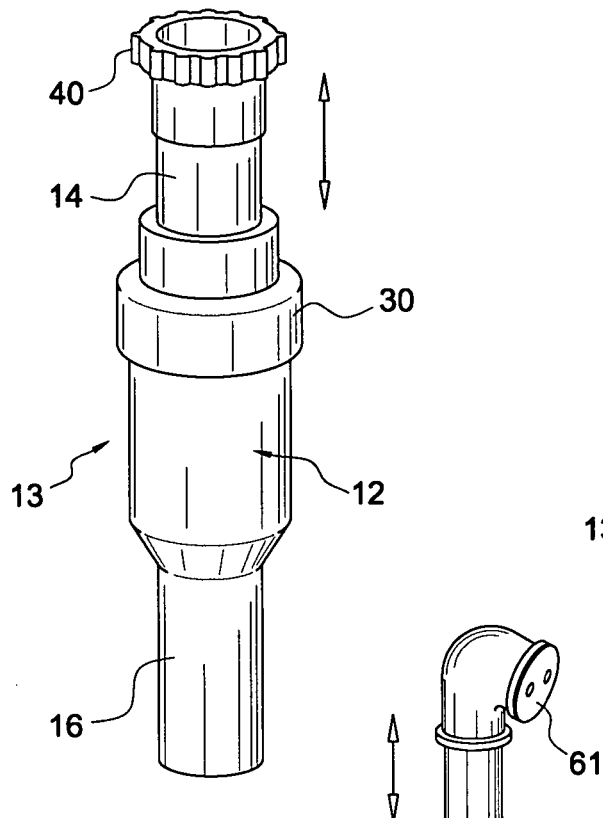
FIG. 4 is a perspective view of the inline fitting wherein the cylindrical extension on the piston has a threaded collar or ring and is adapted to connect with a lavatory drain or other plumbing component.

As shown in FIG. 4, the cylindrical extension 14 of the piston is modified to have a threaded collar 40 for threaded engagement with the drain of a lavatory, for example. In this embodiment the slip joint 13 enables the drain from a sink or the like to be connected with a drain pipe quickly and easily, with a minimum number of parts and without the need to accurately measure and cut the drain pipe. This also would enable the same slip joint fitting and drain connection to be used (or re-used) with another sink having a different depth, for example.

Figure 5:
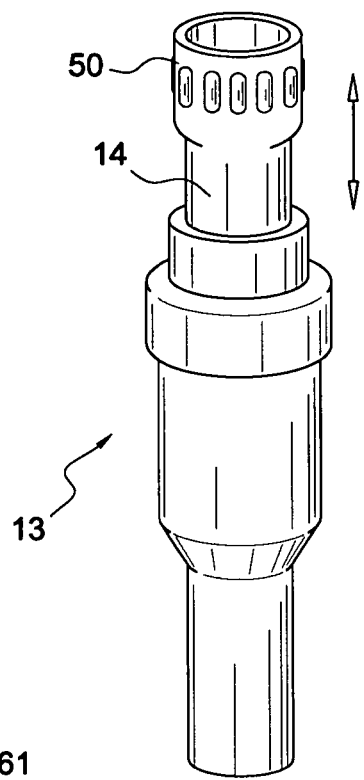
FIG. 5 is a perspective view of the inline fitting wherein the cylindrical extension on the piston has an apertured end forming a part of a circuit breaker in a flush valve, for example.

In FIG. 5, the cylindrical extension 14 is modified to have an apertured end 50 that forms a part of a vacuum breaker coupling in a flush valve (not shown), for example. The same advantages noted in connection with the FIG. 4 embodiment apply also to this form of the invention.

Figure 6:
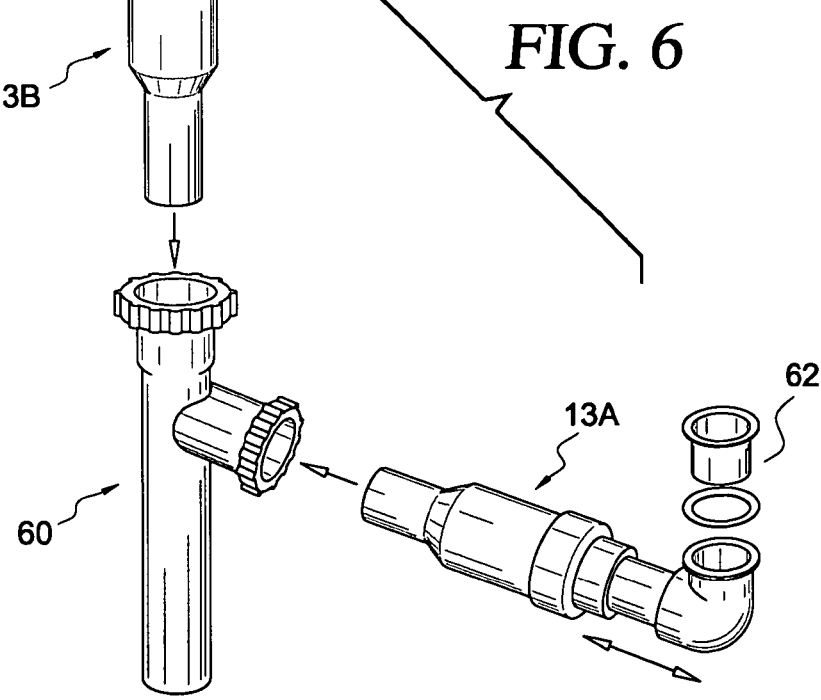
FIG. 6 is an exploded perspective view of a pair of the inline fittings adapted to connect the overflow and drain of a bathtub with a standard T-fitting.

A further advantageous use of the invention is illustrated in FIG. 6, wherein first and second slip joint fittings 13A and 13B according to the invention are connected to a conventional T-fitting 60, with the fittings 13A and 13B disposed orthogonally to one another for connection, respectively, to the overflow and drain of a bathtub (not shown). To this end, the cylindrical extensions 14A and 14B of the pistons in the respective slip joints have fittings 61 and 62 for connection with the overflow and drain, respectively, of a bathtub. The use of the slip joints 13A and 13B enables inventory and use of standard parts that are adaptable to different tubs having different spacing between and location of the overflow and drain openings in a bathtub, without the need for careful measurement and fitting of multiple components to make the connections, thus greatly facilitating the installation of these connections.

FIGS. 7 and 8 show a variation of the embodiment of FIG. 6, wherein the slip joints 13A' and 13B' are integrally incorporated in a T-fitting 70, whereby only a single part is needed to connect the overflow and drain of a bathtub. Moreover, because of the adjustability of the slip joints the same fitting 70 can be used with many different tubs having different locations and spacing of the overflow and drain openings. The T-fitting 70 comprises a T-shaped body 71 having a lower end 72 for connection to a drain pipe (not shown), an upper end 73 with means 73' thereon for connection to a bathtub overflow (not shown), and a lateral end 74 connected to said body between said upper and lower ends and extending orthogonally thereto, with means 74' on said lateral end for connection to a bathtub drain (not shown). The lateral end and the upper end have longitudinally adjustable slip joints 13A' and 13B', respectively, whereby said fitting is adaptable to different tubs having different spacing between and location of overflow and drain openings in a bathtub, without the need for careful measurement and fitting of multiple components to make the connections, thus greatly facilitating the installation of these connections. The slip joints are substantially identical and comprise an elongate cylindrical body 77 and 77', respectively, each having an outer end 77A and a reduced diameter inner end 77B defining an interior annular tapered shoulder 78, and a cylindrical extension 79 and 79', respectively, longitudinally reciprocable in the respective upper end and lateral end. Said cylindrical extensions have respective first ends 79A, 79A' and second ends 79B, 79B', said first ends being telescopically received in the body, and said second end 79B' having said means 73' for connection to a bathtub overflow and said second end 79B having said means 74' for connection to a bathtub drain.

FIG. 9 depicts a further embodiment of the invention, wherein the slip joint 13 is incorporated in a continuous waste assembly 80 adapted to connect the drains of a double sink (not shown) with a drain pipe (not shown). The assembly 80 can be manufactured and sold as a single pre-assembled piece, thereby facilitating the ease and speed with which the drain connections of a double sink can be made, or the simple inline fitting 13 of FIGS. 1-3 can be assembled on site with conventional plumbing fittings to make up the assembly shown in FIG. 9.

A further example of a suitable use for the slip joint of the invention is shown at 90 in FIG. 10, wherein the slip joint 13' is incorporated in the vertical part of a drain trap 91, thus enabling the vertical positioning of the drain trap to be quickly and easily accomplished without the need for measuring, cutting and gluing various components. The drain trap comprises a J-shaped body 92 having a first end section 92A, a second end section 92B spaced from and generally parallel to the first end section, and a depending bight portion 92C connected between the first and second end sections, said bight portion defining a trap for holding a quantity of water (not shown) to prevent flow of gas through said trap. The first end section has means 93 thereon for attachment to a drain pipe (not shown), and the second end section has means 94 thereon for attachment to a part to be drained (not shown). The slip joint comprises an elongate cylindrical body 95 having one end 95A connected to said bight portion and an opposite open end 95B in which a cylindrical extension 96 is telescopically received. Said one end 95A of the body is reduced in diameter, defining an interior annular tapered shoulder (not shown—see FIG. 3) providing a smooth transition for flow of fluid through the trap and minimizing retention of solids as they pass through said trap. The cylindrical extension 96 has an outer end 96A on which is provided the means 94 for attachment to a part to be drained. A cap 98 is secured on said opposite open end 95B of said body, and has a central bore (see FIG. 3) through which the cylindrical extension is telescopically received, and defines an annular stop shoulder (see FIG. 3) facing axially inwardly of the body. The cylindrical extension has radially enlarged sealing means (see FIG. 3) on an inner end thereof in slidable sealing engagement with an interior surface of the body. The interior annular tapered shoulder in the body and the annular stop shoulder on said cap define spaced stops against which the sealing means on the cylindrical extension abuts to retain the cylindrical extension in the body but that permit longitudinal adjustment of the cylindrical extension in the body, said slip joint enabling the trap to be quickly and easily connected between a drain pipe and a part to be drained that are spaced various distances apart.

A first embodiment of a water closet flange for connecting a water closet (not shown) to a sewage drain pipe is indicated generally at 100 in FIGS. 11 and 12. In this embodiment, the closet flange 101 is integrally formed with a cylindrical piston 102 rotatable and reciprocable in housing 103. The lower end 104 of the housing is reduced in diameter, forming an interior annular tapered shoulder 105, terminating at its inner margin in an annular rib 106. As in the earlier embodiments, the piston comprises an elongate tubular body with a pair of first and second closely spaced annular rings 22 and 23 on one end thereof, and a cylindrical extension 14' at the other end. An o-ring seal 25 is retained between the first and second rings for affecting a sliding seal with the interior surface of the housing, and a third annular ring 26 is on the body, spaced from the pair of rings toward the cylindrical extension, and functions to help align the piston coaxially with the housing. A cap or collar 30' is secured on the end 15' of the housing, with a reduced diameter portion 31' having a central bore 32' therethrough and defining an annular shoulder 33' facing axially inwardly of the housing. The cylindrical extension 14' on the piston extends slidably through the central bore 32' in the cap, and the third annular ring 26 on the piston cooperates with the annular shoulder in the cap to retain the piston in the housing. In a preferred embodiment, the cap is threaded onto the housing. The end of the piston carrying the o-ring cooperates with the tapered annular shoulder 105 in the housing to limit the extent of telescoping of the piston into the housing.

The diameter of the lower end of the housing is selected to telescopically receive the upper end of a sewage drain pipe 108, so that the housing 103 is supported on the drain pipe. The piston and attached flange 101 can then be telescoped up or down as needed in order to position the flange relative to the surface of a floor in which the water closet flange is mounted. In addition, the piston and attached flange can be rotated relative to the housing to align the openings in the flange for receiving fasteners commonly employed for attaching a water closet to the flange.

The flange assembly 100 can be manufactured and sold pre-assembled, so that minimum work is required on site when the flange is being installed.

An alternate embodiment to that shown in FIGS. 11 and 12 is shown at 110 in FIGS. 13 and 14, wherein the relationship of the piston 111 and housing 112 is reversed from the prior embodiment. That is, the flange 101 is integrally formed with the housing, and the extension 113 of the piston is adapted to be telescoped in or over the upper end of the sewage drain pipe to mount the assembly to the pipe. Downward movement of the housing and flange relative to the piston is limited by engagement of the upper end of the piston with an inwardly projecting annular rib 114 in the upper end of the housing. In other respects, this form of the invention functions the same way as the FIG. 11 embodiment.

Although particular embodiments of the invention are illustrated and described in detail herein, it is to be understood that various changes and modifications may be made to the invention without departing from the spirit and intent of the invention as defined by the scope of the appended claims.

What is claimed is:

1. An adjustable drain trap for connection between a drain pipe and a part to be drained without requiring excessive measuring and cutting to fit said drain trap in place, said drain trap comprising:

a J-shaped body having a first end section, a second end section spaced from and generally parallel to the first end section, and a depending bight portion connected between the first and second end sections, said bight portion defining a trap for holding a quantity of water to prevent flow of gas through said trap;

said first end section having means thereon for attachment to said drain pipe;

said second end section comprising an elongate cylindrical housing having an open upper end and a lower end connected to said bight portion, said housing being enlarged in diameter relative to said lower end and defining a first interior annular tapered shoulder at the lower end of the housing, said tapered shoulder providing a smooth transition for flow of fluid through the housing and defining a first annular stop shoulder facing axially inwardly of the housing;

a cap secured on said open upper end of the housing, said cap having a central bore therethrough and defining a second annular stop shoulder facing axially inwardly of the housing at an upper end thereof;

a longitudinally adjustable cylindrical extension having a continuous open passageway throughout its length and having a lower end reciprocable in said housing and an upper end projecting through said open upper end of the housing and through the bore in said cap, said upper end of said extension having means thereon for attachment to said part to be drained, said lower end having radially enlarged sealing means thereon in slidable sealing engagement with an inner surface of said housing, and an annular guide and stop ring on said cylindrical extension spaced from said radially enlarged sealing means, said guide and stop ring being slidable against an inner surface of said housing to aid in coaxially aligning the extension in the housing and to form a stop to engage said second stop shoulder to limit outward movement of said extension relative to said housing, said first and second annular stop shoulders in said housing defining spaced stops that permit reciprocation of said extension in the housing to accommodate different spacing of said drain pipe and said part to be drained and to permit reciprocating movement of said extension in said housing after said drain trap is installed but retaining the cylindrical extension in the housing.

* * * * *